United States Patent [19]

Grimes

[11] Patent Number: 4,540,639

[45] Date of Patent: Sep. 10, 1985

[54] METHOD AND APPARATUS FOR MAINTAINING THE PH IN ZINC-BROMINE BATTERY SYSTEMS

[75] Inventor: Patrick G. Grimes, Westfield, N.J.

[73] Assignee: Exxon Research & Engineering Company, Florham Park, N.J.

[21] Appl. No.: 622,183

[22] Filed: Jun. 19, 1984

Related U.S. Application Data

[63] Continuation of Ser. No. 445,969, Dec. 1, 1982, abandoned.

[51] Int. Cl.$^3$ ............................................. H01M 8/04
[52] U.S. Cl. ...................................... 429/17; 429/19; 429/50; 429/105
[58] Field of Search .................. 429/14, 15, 17, 19, 429/13, 50, 51, 101, 105; 423/487

[56] References Cited

U.S. PATENT DOCUMENTS

| | | | |
|---|---|---|---|
| 3,848,065 | 11/1974 | Paulik | 423/487 |
| 4,113,924 | 9/1978 | Kantner | 429/59 |
| 4,144,381 | 3/1979 | Fatica | 429/105 |
| 4,343,868 | 8/1982 | Putt | 429/17 |

*Primary Examiner*—Charles F. LeFevour
*Attorney, Agent, or Firm*—Joseph J. Dvorak

[57] ABSTRACT

A method and apparatus for maintaining the pH level in a zinc-bromine battery features reacting decomposition hydrogen with bromine in the presence of a catalyst. The catalyst encourages the formation of hydrogen and bromine ions. The decomposition hydrogen is therefore consumed, alloying the pH of the system to remain substantially at a given value.

8 Claims, 2 Drawing Figures

METHOD AND APPARATUS FOR MAINTAINING THE PH IN ZINC-BROMINE BATTERY SYSTEMS

The Government of the United States of America has rights in this invention pursuant to Contract No. 49-2862 entered into with Sandia National Laboratories on behalf of the United States Department of Energy.

This is a continuation of application Ser. No. 445,969 filed 12/1/82 now abandoned.

FIELD OF THE INVENTION

This invention pertains to zinc-bromine battery systems, and more particularly to a method and apparatus for maintaining the pH value of zinc-bromine batteries.

BACKGROUND OF THE INVENTION

The zinc-bromine battery has recently attracted much attention as a viable system for the future. The basic zinc bromine battery system is shown in a patent to A. Venero, U.S. Pat. No. 4,105,829 issued Aug. 8, 1978.

The zinc-bromine system comprises a series of cells which are provided with circulating electrolyte. The electrolyte is stored in a reservoir when the battery system is quiescent.

During the operation of the zinc-bromine battery, small quantities of hydrogen are produced. This decomposition hydrogen acts to increase the pH of the system, which eventually leads to the formation of zinc oxide/hydroxide solids. These solids interfere with the performance of the battery, such that it becomes desirable to prevent this from occurring.

The present invention consumes the formed hydrogen by reacting it with bromine to form acid before it can form the aforementioned solids. This prevents the pH from rising and forming the undesirable zinc oxide/hydroxide solids.

DISCUSSION OF RELATED ART

In U.S. Pat. No. 4,113,924; issued Sept. 12, 1978, an electrochemical zinc-halogen cell is described in which decomposition gaseous hydrogen is consummed by use of a charged auxiliary electrode.

The above-mentioned battery has several drawbacks, one of which is that the auxiliary electrode device will only work to a substantial degree in a sealed system, wherein there is sufficient hydrogen build-up, such that the hydrogen surrounds the electrode.

Such an auxilliary electrode device is closely cupped to and near the power electrodes in a cell. This would not be efficient in a circulating system, wherein the decomposition hydrogen is carried by the circulating electrolytes throughout the system to the gas space of the system in a thinly veiled manner.

The subject invention continuously converts gaseous decomposition hydrogen without the need for an auxiliary power source and without requiring a build-up of hydrogen gas.

BRIEF SUMMARY OF THE INVENTION

The invention relates to a method and apparatus for recombining gaseous decomposition hydrogen with bromine in a zinc-bromine battery system. The gaseous decomposition hydrogen is reacted with bromine in the presence of a catalyst which encourages the formation of hydrogen and bromide ions. The gaseous hydrogen is consumed and the pH of the system is substantially maintained at a given value.

A catalyst for the purpose of forming hydrogen and bromide ions can comprise ruthenium, or platinum. Platinum, however, can find its way into the electrolyte, and eventually plate-out upon the zinc electrode. Therefore, ruthenium is preferred for long term systems, because of its inability to plate-out upon the zinc.

Other catalysts which can be used are calcined metal sulfides, high surface area activated carbon and oxide supported metals. The catalyst is easily employed by disposing it in the reservoir of the zinc-bromine circulating battery system. The catalyst can be disposed at the gas/liquid interface, or in either the gas on the liquid phase.

It is an object of this invention to provide an improved zinc-bromine battery system;

it is another object of the invention to provide a means of maintaining the pH value of a zinc-bromine battery;

it is a further object of this invention to provide a means of recombining gaseous decomposition hydrogen with bromine in a circulating zinc-bromine system.

These and other objects of the invention will become more apparent and will be better understood with reference to the following detailed description considered in conjunction with the accompanying drawings.

DETAILED DESCRIPTION OF THE INVENTION

Figure 1:
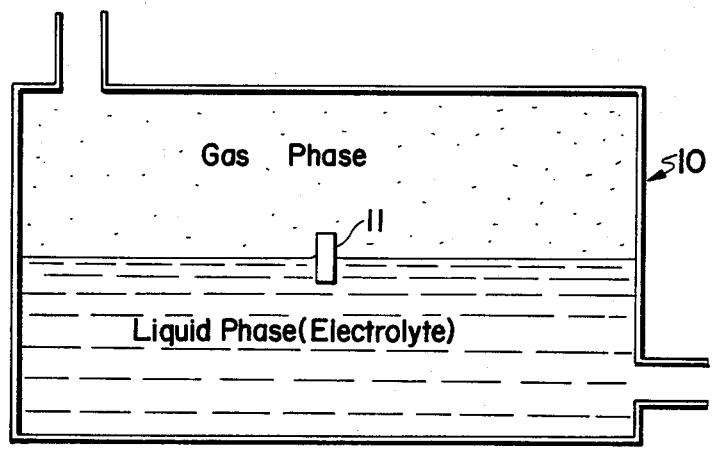
FIG. 1 is a schematic in situ view of the catalyst of the invention in the reservoir of the circulating battery system.

Generally speaking, zinc halogen batteries produce small quantities of hydrogen. The net effect is the reaction:

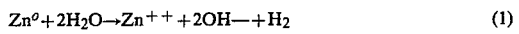

$$Zn^o + 2H_2O \rightarrow Zn^{++} + 2OH^- + H_2 \qquad (1)$$

This results in an increase in the pH of the system. This could eventually lead to the formation of zinc oxide/hydroxide solids which would interfore with battery performance.

The functional zinc halogen battery gas equal quantities of zinc metal and halogen produced in the charge process. Consumption of zinc by the above process leaves an equivalent amount of bromine in the system. Reaction of the hydrogen with the bromine "left" behind will restore the pH through production of HBr, as detailed in the following equations:

$$H_2 + Br_2 \rightarrow 2HBr \rightarrow 2H^+ + 2Br^- \qquad (2)$$

$$2H^+ + 2OH^- \rightarrow 2H_2O \qquad (3)$$

The summation equations are thus:

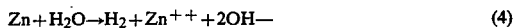

$$Zn + H_2O \rightarrow H_2 + Zn^{++} + 2OH^- \qquad (4)$$

$$H_2 + Br_2 \rightarrow 2H^+ + 2Br^- \qquad (5)$$

$$2H^+ + 2OH^- \longrightarrow 2H_2O \qquad (6)$$

$$Zn^o + Br_2 \rightarrow Zn^{++} + 2Br^- \qquad (7)$$

Hydrogen and bromine can be combined in the presence of a catalyst, such as ruthenium.

Figure 1A:
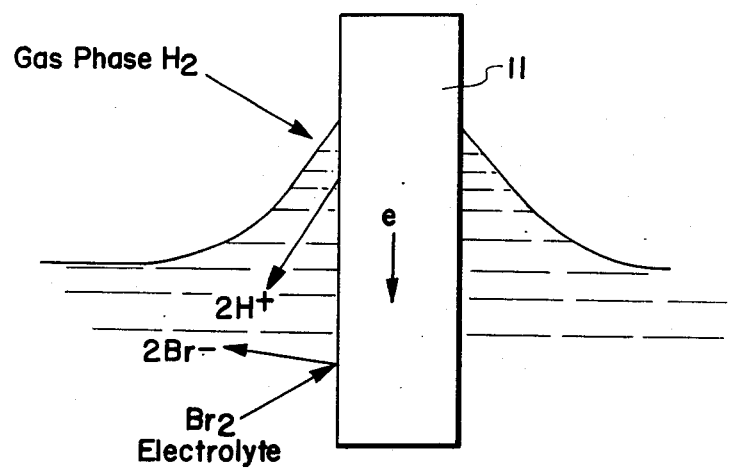
FIG. 1a is a schematic view of the chemical reaction which takes place about the catalyst of FIG. 1.

Referring to FIG. 1, a reservoir 10 of a zinc-bromine circulating battery system is shown. A catalyst 11 for encouraging hydrogen and bromide ions (ruthenium) is disposed at the gas/liquid interface within reservoir 10. The catalyst 11 is shown in greater detail in FIG. 1a.

Hydrogen in the gas phase diffuses to the gas/liquid catalyst 11 interface where hydrogen is oxidized to 2 protons with electron release to an electronically conductive substrate. The electrons are conducted to another region where bromine from the electrolyte is electrochemically converted to 2 bromide ions. The net reaction is:

$$H_2 + Br_2 \rightarrow 2H^+ + 2Br^- \qquad (8)$$

The potential for this reaction is 1.08 volts. Hydrogen activation catalysts are needed at the interfacial region and correspondingly bromine activation catalysts in the electrolyte region. The catalytic activity need not be high since there is a high driving force (1.08 volts) in this system.

In a functioning battery system, the catalytic section could be floated on rafts at the gas/liquid interface in the battery reservoir as illustrated in FIG. 1.

Alternately, the recombination system could be in the gas or liquid phase. In the gas phase bromine vapors from the electrolyte together with hydrogen gas could be diffused to catalysts held in the gas phase and which are wet with aqueous HBr. The aforementioned reactions would occur and the HBr would transfer as an azeotrope with water to the electrolyte, restoring the pH.

Similar phenomena might apply with other halogens.

The use of ruthenium is preferred over other catalysts, such as platinum for the reason that ruthenium does not have the disadvantage of plating-out upon the zinc electrode, if it should find its way into the electrolyte.

Having thus described the invention, what is desired to be protected by Letters Patent is presented in the following appended claims.

What is claimed is:

1. A method for recombining gaseous decomposition hydrogen with bromine in a zinc-bromine battery system, comprising the steps of: reacting gaseous decomposition hydrogen with bromine within said zinc-bromine system in the presence of a catalyst supported on an electronically conductive substrate and disposed at a gas/liquid interface of said system for causing formation of hydrogen and bromide ions, whereby said gaseous decomposition hydrogen is consumed and the pH of the system is substantially maintained at a given value.

2. The method of claim 1, wherein said catalyst comprises ruthenium.

3. The method of claim 1, wherein said catalyst is disposed in a reservoir of said system.

4. The method of claim 1, wherein said catalyst is free-floating in a liquid phase of said system.

5. A zinc-bromine battery system which consumes its decomposition gaseous hydrogen so that the pH of the system is substantially maintained at a given value, comprising a catalyst supported on an electronically conductive substrate and disposed at a gas/liquid interface of said system for causing formation of hydrogen and bromide ions in the presence of said decomposition gaseous hydrogen and bromine.

6. The zinc-bromine battery system of claim 5, wherein said catalyst comprises ruthenium.

7. The zinc-bromine battery system of claim 5, wherein said catalyst is disposed in a reservoir of said system.

8. The zinc-bromine battery system of claim 5, wherein said catalyst is free-floating in a liquid phase of said system.

* * * * *